April 7, 1959 W. GLAMANN 2,880,571
DEVICES FOR VARYING THE POWER AND DRIVE OF
INTERNAL COMBUSTION ENGINE VEHICLES
Filed Jan. 5, 1954 4 Sheets-Sheet 1

INVENTOR.
WILHELM GLAMANN
BY
ATTORNEY.

April 7, 1959

W. GLAMANN 2,880,571

DEVICES FOR VARYING THE POWER AND DRIVE OF
INTERNAL COMBUSTION ENGINE VEHICLES

Filed Jan. 5, 1954

INVENTOR.
WILHELM GLAMANN

BY

*Robert E Burns*

ATTORNEY.

April 7, 1959 W. GLAMANN 2,880,571
DEVICES FOR VARYING THE POWER AND DRIVE OF
INTERNAL COMBUSTION ENGINE VEHICLES
Filed Jan. 5, 1954 4 Sheets-Sheet 4

INVENTOR.
WILHELM GLAMANN
BY
ATTORNEY.

United States Patent Office 2,880,571
Patented Apr. 7, 1959

2,880,571

DEVICES FOR VARYING THE POWER AND DRIVE OF INTERNAL COMBUSTION ENGINE VEHICLES

Wilhelm Glamann, Lyons, France

Application January 5, 1954, Serial No. 402,378

Claims priority, application Germany January 5, 1953

6 Claims. (Cl. 60—13)

This invention relates to the control of automotive vehicles propelled by internal combustion engines, and notably to devices adapted to yield a momentary increase in the engine power.

In my co-pending U.S. patent application Serial No. 228,019 (now abandoned) filed May 24, 1951, and entitled "Improvements in the Control of Internal Combustion Engine Vehicles," there is described a driving unit for an automotive vehicle whereby the engine power is transmitted to the vehicle's driving wheels and, through the intermediary of a distributing mechanism or epicyclic gear, to auxiliary apparatus, the latter being driven through a step-up gear mechanism.

This invention is concerned with improvements in the control of the engine supercharging means. By suitably disposing clutch means in said step-up gear mechanism, and controlling same through the driver-actuated accelerator and/or brake pedals, the supercharging compressor is put automatically in or out of operation, according to the conditions in which the vehicle is being run, and according to an essential feature of this invention, if necessary, the conventional or main engine clutch is dispensed with, its action being replaced by that of the aforesaid clutch means.

On the other hand, as the vehicle is equipped with a turbine driven by the exhaust gases from the engine, and, under certain conditions, by the compressed air from the supercharging circuit, a momentary power increase is obtained, according to this invention, by injecting water in this circuit.

According to another feature of this invention, a possible racing of the turbine is prevented in the special arrangement described in my co-pending U.S. patent application Serial No. 228,019 (now abandoned) of May 24, 1951, by the provision of a device comprising coupling means responsive to the action of centrifugal force and adapted to modify the reducing ratio between the turbine shaft and the transmission shaft according to the velocity of rotation of this last-mentioned shaft.

These arrangements make it possible to utilize the complemental power output of the turbine not only at the low engine speeds but also at average and high engine speeds.

According to another feature of this invention, a torque converter is inserted in the drive of the auxiliary supercharging apparatus, said torque converter being adjusted automatically according to the barometric pressure and/or the torque transmitted through the accelerator pedal.

Finally, this invention also provides coupling means disposed in the mechanism controlling said auxiliary apparatus, whereby the engine speed may be reduced to low values without disconnecting the driving output shaft.

It is known to compensate the irregular running of an engine at low speeds by inserting a relatively bulky hydraulic or like coupling in the main transmission. According to this invention, this now conventional coupling is replaced by a very flexible coupling having much smaller over-all dimensions, incorporated in the mechanism for driving the auxiliary apparatus.

The main advantages resulting from this invention are a simplification in the driving of the vehicle, a reduction in the over-all dimensions and cost of certain members, an increase in the propelling power of the vehicle, the fact that the vehicle's engine can be rendered almost insensitive to the influence of high altitude, and an increase in its pick-up power.

Other features and advantages of the invention will become apparent as the following description proceeds with reference to the accompanying drawing forming part of this specification and illustrating diagrammatically by way of example a few embodiments of the invention. In the drawing.

Figure 1:
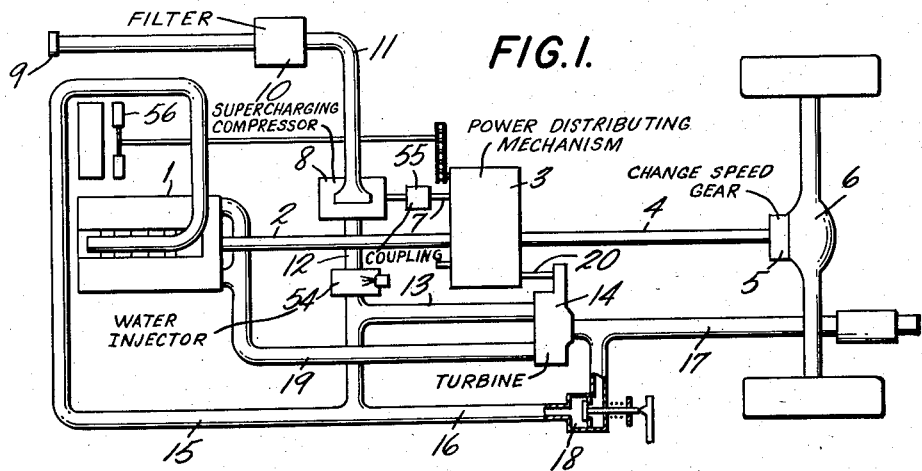
Figure 1 is a diagrammatic plan view showing a driving arrangement according to the invention for an internal combustion engine vehicle.

Referring first to Fig. 1, the internal combustion engine 1 of the vehicle is coupled through a shaft 2 with a power distributing mechanism enclosed in a case 3 and adapted to drive, through its output shaft 4, the change-speed gear 5 and the rear axle 6, and, through another shaft 7, a supercharging compressor 8.

The supercharger 8 draws in air through the inlet 9, filter 10 and pipe 11 and feeds this air to a pipe 12 from which it is distributed under certain conditions, as set forth in the said co-pending U.S. patent application Serial No. 228,019 (now abandoned), to a pipe 13 for driving a turbine 14, a pipe 15 for supercharging the engine 1 and a pipe 16 for discharging the air into the exhaust pipe 17 of the vehicle under the control of a discharge device 18.

The turbine 14, which is still driven by the engine exhaust gases passing through the pipe 19 and subsequently fed after expansion into the exhaust pipe 17, drives the shaft 20 and through the medium of the mechanism enclosed in the case 3 assists in driving the transmission shaft 4.

Figure 2:
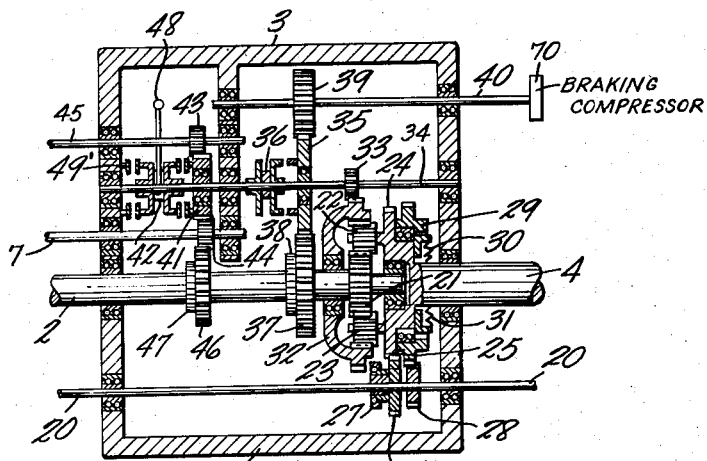
Figure 2 is a diagrammatic sectional view showing the mechanism for distributing the driving power of the vehicle.

The power distributing mechanism is shown in detail in Fig. 2. The inner end of shaft 2 carries in this case 3 a sum gear 21 of an epicyclic train of gears. The planet pinions 22 and 23 are in meshing engagement with this sum gear 21 and are journaled in a carrier 24 rotatably fast with the transmission shaft 4.

The carrier 24 is also formed with an outer set of teeth 25 in meshing engagement with a pinion 26 mounted on the turbine-driven shaft 20 (see Fig. 1) through the medium of an unidirectional device, for instance a freewheel 27. This shaft 20 also carries a pinion 28 meshing with a toothed annulus 29 journaled for loose rotation on the carrier 24. In addition, the transmission shaft 4 carries centrifugal or inertia blocks 30 constantly urged by springs 31 toward the shaft 4 and adapted, when the shaft 4 rotates at a predetermined speed, to drivingly connect (by friction or otherwise) this shaft 4 with the toothed annulus 29.

As long as shaft 4 rotates at a speed lower than that at which the centrifugal blocks 30 drivingly connect the shaft 4 with the toothed annulus 29, the carrier 24 is driven through the set of teeth 25 from the pinion 26, thereby rotating the output shaft 4. Pinion 28 drives the outer annulus 29 and the latter rotates freely. The two pairs of pinions 25—26 and 28—29 comprise two gear trains with different ratios in order to connect shaft 4 with shaft 20 in different ratios, the largest ratio (25—26) being employed for the lower speeds of the shaft 4, and the smallest ratio for the higher speeds of the shaft 4.

When the said predetermined speed is attained, the meshing set of gears 28, 29 becomes operative and as pinion 26 rotates at a faster speed than the hub portion of the freewheel device 27, this pinion is no longer fast with shaft 20. The reverse change in gear ratio takes place when the speed of the transmission shaft 4 drops again to a value below said predetermined speed.

The input shaft 2 has mounted for free rotation thereon an intermediate annulus 32 formed with an inner set of teeth meshing with the planet pinions 22 and 23, and an outer set of teeth meshing with a pinion 33 rotatably fast with an intermediate shaft 34.

Shaft 34 has mounted for free rotation thereon an intermediate toothed wheel 35 adapted to be made rotatably fast with this shaft 34 through a clutch 36 when the latter is moved to the right, by a control element which may suitably be a pedal, according to Figure 2. This wheel 35 is also driven from the toothed wheel 37 and the relevant freewheel device 38, under certain conditions of operation of the vehicle. The toothed wheel 35 is in constant meshing engagement with a pinion 39 keyed on a shaft 40 driving an auxiliary apparatus coupled thereto, for example a braking compressor 70. Thus, the purpose of the clutch is to drive, under certain conditions of operation of the vehicle, described below, the auxiliary apparatus, e.g. braking compressor 70, by means of the toothed wheel 35, the pinion 39 and the shaft 40.

On the intermediate shaft 34, there is also mounted for loose rotation a toothed wheel 41 adapted, upon actuation of a clutch device 42 (which as shown may be of the friction type), to be made rotatably fast with shaft 34, for example when said clutch device is moved to the right. The toothed wheel 41 is adapted to drive, through the relevant pinions 43 and 44, the shafts 45 and 7, respectively, controlling other auxiliary apparatus; thus, shaft 7 may be operatively connected to a supercharging compressor 8, and shaft 45 to an air fan 56, or vice-versa (see Figs. 1 and 2). The pinions 44, 41 and 43, under certain conditions of operation of the vehicle, described below, are also driven from the wheel 46 fast with the input shaft 2 with the assistance of a freewheel device 47. The clutches 42 and 36 both slide on the shaft 34 while being engaged in rotation by the latter. They can therefore be actuated independently of each other.

The arrangement described hereinabove operates as follows:

With the control lever 48 positioned as shown in Fig. 2 and the clutch member 42 in its inoperative or neutral position, shaft 34 may rotate freely. Under these conditions, the engine may be started or stopped, and the speeds changed at will, without using the conventional main clutch mounted on the output shaft of the engine, so that this clutch can be dispensed with. Since the clutch 42 is thrown out of gear, the supercharging compressor 8 is no longer engaged. In the same manner the clutch 36, which is employed only for braking, is thrown out of gear, the shaft 34 rotates at a faster speed and there is no load required by the epicycloidal train 21—22—23. The change-speed gear 5 may then be actuated without difficulty. As the clutch 42 has only a reduced portion of the engine torque to transmit, this clutch is of relatively small dimensions although it acts as a substitute for the conventional clutch. When the lever 48 is moved to the right, the friction linings provided on the clutch sleeve 42 engage the linings fixed on the corresponding face of gear 41. The latter is thus caused to rotate bodily with shaft 34 and drives shafts 7 and 45, and consequently the engine supercharger will be actuated. When the vehicle is stationary, the supercharger is actuated upon operation of the clutch. If the vehicle is running, such operation of the clutch will bring into play the new speed. In other words, the clutch 42 plays the role of an ordinary clutch, when a new ratio has been set in the change-speed gear 5 after 42 has been thrown out of engagement, the clutch once again, by being moved towards the right of the lever 48, brings this new ratio from 42 in order to be active. However, when the clutch lever 48 is moved to the left according to the figure, the friction linings of the sliding sleeve 42 will engage corresponding linings 49' secured on the registering inner wall of the case 3. Thus, the shaft 34 is held against motion together with the outer annulus 32. Regarding the supercharging compressor, it rotates either freely—as it is driven by the low inlet vacuum of the engine, if a displacement compressor is used—or through the intermediary of pinion 46.

With this arrangement according to one form of embodiment of the invention, any waste of energy by the supercharger at low engine velocity or power output is avoided and the maximum speed of the engine is increased since the holding of shaft 34 against rotation by the action of lining 49' has the same effect as a change of speed with a conventional change-speed transmission since that has the effect of blocking the annulus 32. Finally and as already explained hereinabove, the invention leads to the reduction of the conventional friction clutch so that it becomes possible to control the vehicle through a single lever in connection with two accelerator pedals, for example.

Figure 3:
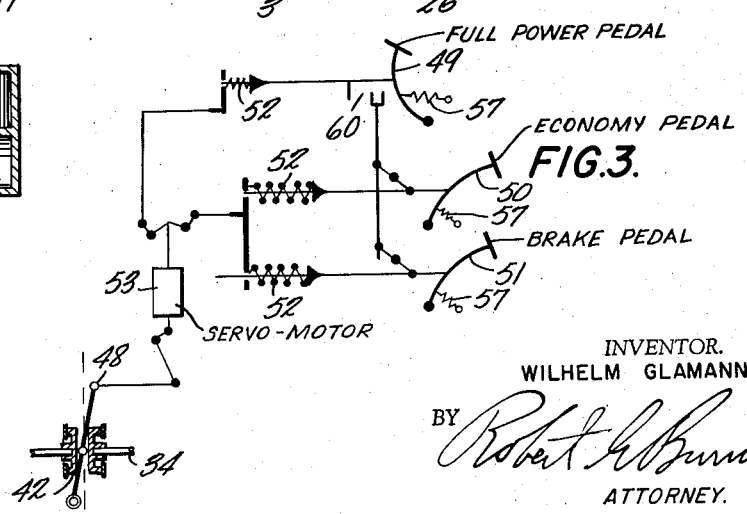
Figure 3 shows diagrammatically the manner in which the functions of the distributing mechanism are controlled by the accelerator and brake pedals.

Figure 3 illustrates one possible form of embodiment of a control of this type. The "full power" pedal 49, "economy" pedal 50 and "brake" pedal 51 are connected to separate return springs 57 and act through other springs 52 of the dual traction-compression type on a servo-motor 53 of conventional type controlling the lever 48 of the clutch member 42 already described hereinabove.

The arrangement is such that the lever 48 is in its intermediate vertical position when all the pedals are in their inoperative positions. Then the engine may be started and operated at idling speed, its output shaft 2 driving the intermediate shaft 34 for loose rotation in the mechanism.

Upon depression of the "economy" pedal 50 the lever 48 is moved to the left. This displacement of the clutch member may also be obtained by depressing the brake pedal 51 when the vehicle is not provided with a braking compressor driven by the power distributing mechanism mounted in the case 3. On the other hand, if the driver depresses the "full power" pedal 49, the clutch sleeve 42 will be moved to the right of the figure and be engaged with the gear pinion 41, and drive the supercharger 8 through the shaft 7, so that the engine power is momentarily increased and the vehicle is allowed to more easily start, if required. The brake pedal 51 acts on the clutch 36 in order to make the shaft 34 solid with pinion 35 and engage the braking compressor mounted on the shaft 40. In the opposite sense, the brake pedal acts as previously indicated on the servomotor 53 in order to displace the lever 48 towards the left and block the shaft 34, in order to make it possible to obtain braking by the engine.

The three pedals 49, 50 and 51 are interlocked by means of an interlock 60 so that the "full power" pedal 49 will be released only when the other two pedals are in their inoperative positions. Again, the "economy" pedal 50 and brake pedal 51 can be actuated only when the "full power" pedal 49 is in its rest position. The pedals 49 and 50 act by standard means on the fuel delivery members of the engine. The pedal 50 will be able, for example, to bring the fuel delivery to its maximum value for an intermediate point of its course; moreover, the pedal 50 will open the fuel inlet to a combustion chamber in front of the turbine.

In Fig. 3, this "full power" pedal 49 is shown in its fully depressed position.

According to this invention, a third accelerator pedal 58 (Fig. 5) may be provided, if desired, to act as an emergency accelerator. The actuation of this pedal will control the injection of water into the supercharging pipe 12 of the engine (Fig. 1). This injection constitutes one of the essential features of this invention and is shown diagrammatically as taking place at 54 in Figs. 1 and 5. According to another form of embodiment adapted more particularly to centrifugal superchargers, the injection of water may be effected at the supercharger inlet 59 (Fig. 6) to improve at the same time the conditions in which the air is compressed. An injection-fuel combustion chamber 60a (Fig. 7) according to a known principle may be disposed in the pipe 13 and this injection may be controlled, according to this invention, by means of the same emergency accelerator pedal 58 actuating the valve 61.

Although the clutch 42 mounted on the intermediate shaft 34 (Fig. 2) transmits a lower torque than if it were mounted on the engine output shaft, it is possible, according to the invention, to reduce the torque by mounting coupling device on the compressor shaft 7 as indicated at 55 (Fig. 1). According to a different form of embodiment, the coupling device 55 will be controlled through a special pedal 62 (Fig. 8) while another coupling positioned at the place of clutch 42 (Fig. 2) will be connected to the "full power" pedal, as described hereinabove.

Figure 4:
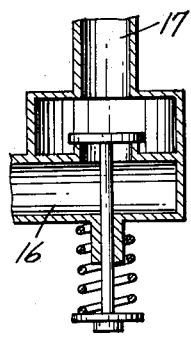
Figure 4 illustrates a different form of embodiment of the discharge device.

If a centrifugal compressor is used, and if a clutch 55 with pedal 62 is used for starting the engine a simple automatic overload valve, instead of the controlled discharge device as shown in Fig. 4, is used.

If the automotive vehicle concerned is to be driven at very different altitudes, or if it is desired to reduce the fuel consumption to a minimum when the vehicle is driven at a normal altitude, this invention, according to a specific embodiment thereof, provides a practical arrangement consisting in mounting a torque converter of any known construction on the supercharging compressor driving shaft at 55 (Fig. 1).

Figure 9:
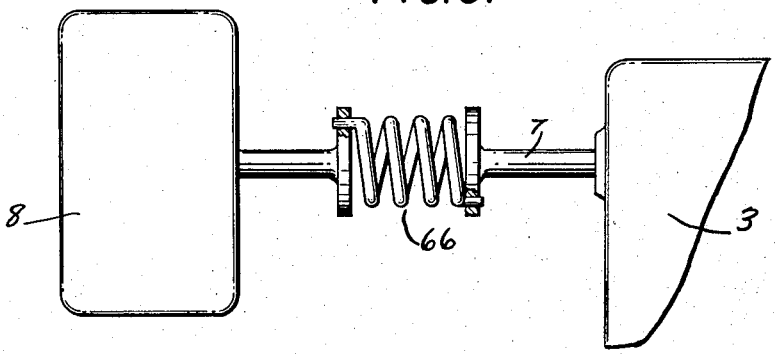
Figure 9 is an elevational view partly in section showing a coil spring providing a flexible coupling in the device of Figure 2.

Regarding the flexible coupling in the mechanism for driving the auxiliary apparatus, this invention provides a torsion bar or a relatively strong coil spring 66 (Fig. 9) for receiving the driving torque from shaft 7 and transmitting it to compressor 8.

Figure 10:
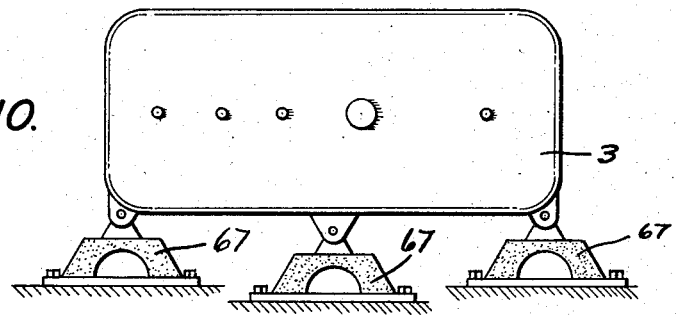
Figure 10 shows a resilient suspension for the case housing the power distributing mechanism.
Figure 11:
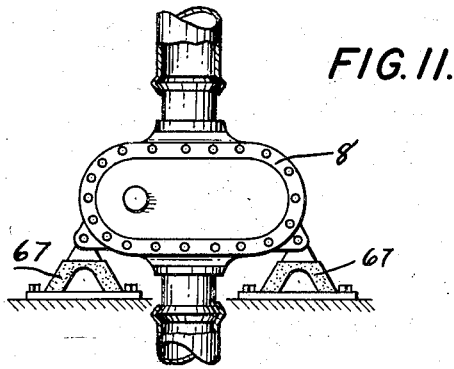
Figure 11 is an elevational view showing a similar suspension of another portion of the device.

According to a further embodiment, the flexible coupling may consist of a resilient suspension either of case 3 (Fig. 10) containing the mechanism for driving the auxiliary apparatus, or of this apparatus itself (Fig. 11).

Having now described the different component parts of the device according to the invention and their operation, the following is a description of one cycle of operation of the system and its controls.

When the vehicle and the engine are stopped, the change-speed gear 5 may be engaged or disengaged. All of the pedals being in the rest position, the engine is put into operation in the usual or customary manner. The shaft 34 remains in a rest position if the change-speed gear has not as yet been engaged. On the contrary, if the change-speed gear has already been engaged, the shaft 34 rotates freely at a high speed, while the engine, itself, rotates at a slow speed.

When the change-speed gear 5 is engaged, it keeps the shaft 4 immobile. In this case, the annulus 32 is put into rotation and rotates the pinion 33 and the shaft 34. On the contrary, when the change-speed gear is disengaged, the shaft 4 is rotated when the shaft 34 is immobilized by reason of the inertia of the various apparatus units driven by the shafts 7 and 47.

At slow speed, when the auxiliary apparatus units are driven by the shafts 45 and 40, e.g. the fan 56, the water pump and the fuel pump of the engine, the compressor which is adapted to supply compressed air for the braking operation, will rotate at a speed appropriate for the engine by reason of the presence of the pinions 46 and 37. The compressor 8 also rotates slowly, driven either by the vacuum in the intake pipe of the engine, or by means of the pinions 46, 44, 41, 43 (whether or not there is on the shaft 7 a supplementary clutch or a torque converter).

If the change-speed gear is not yet engaged, it is then engaged. This engagement is effected without difficulty. The shaft 34 begins to rotate freely in view of the fact that at this moment the annulus 32 is put into rotation whereas the satellite pinions 22 and 23 are blocked by the shaft 4.

For the starting up of the vehicle under ordinary conditions, it is sufficient to depress pedal 49. This action gradually throws the clutch 41, 42 into gear, and at the same time increases the injection flow to the engine. In view of the above, the engine exerts a driving torque on the shafts 34 and 4. The compressor 8 then begins to rotate in an efficient manner, the pinion 46 becomes free by virtue of the free wheel 47 because of the difference in the ratios between the two pinion driving circuits 46, 44, 41 and the annulus 32 and pinion 33. The engine is increasingly supercharged in proportion to the injection feed and consequently the torque output of the engine is increased. The driving torque of the compressor follows this increase proportionately as does the torque exerted on the shaft 4.

The vehicle, therefore, starts up in as vigorous a manner as the increase of the torque of the engine is rapid and powerful.

Figure 8:
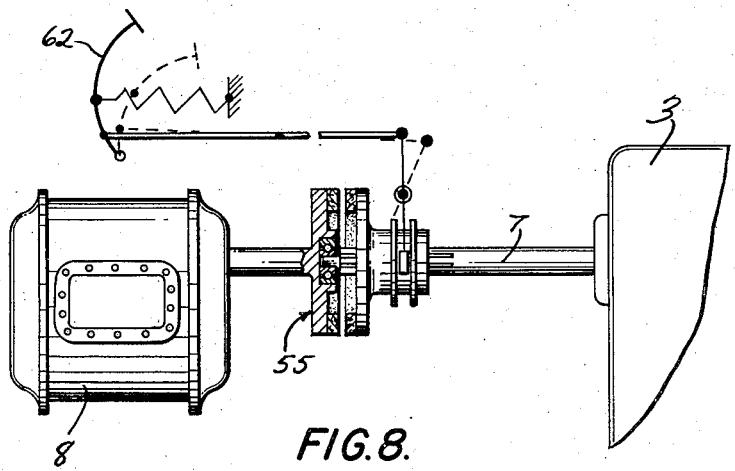
Figure 8 is a partly diagrammatic elevational view partly in section of a portion of the arrangement shown in Figure 1 illustrating the use of a pedal for controlling one of the coupling elements of the construction.

In the case of heavy vehicles, there are starting conditions under which it is necessary to effect any increase in speed, even a very slight speed increment, in a very gradual manner. Thus, the vehicle may be fully loaded and located on a steep slope. Under these conditions, the clutch pedal 62 shown in Fig. 8 is employed. It acts either on the clutch 55, or on the discharge device 18. By activating pedal 62, and at the same time acting on the gas pedal 49, the driver will be in perfect control of each increment of acceleration of the vehicle.

The starting power is increased, in a very efficient manner, by the action of the gas turbine 14. With its initial ratio, the turbine is at its maximum speed and power for a moderate speed of the vehicle. In view of this, the torque exerted by it on the shaft 4 is very high, even when it is under full load. This full load is, on the other hand, assured by the fact that the engine rotates with a very strong overfeed and thus supplies a large quantity of exhaust gas to the turbine.

Figure 5:
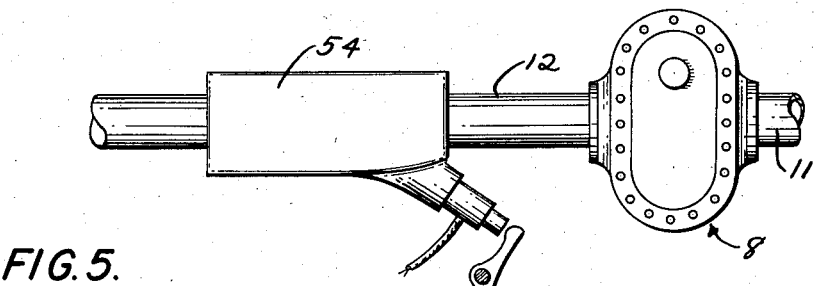
Figure 5 is a diagrammatic view of pedal arrangements in which there is provided a third accelerator pedal for emergency use.
Figure 6:
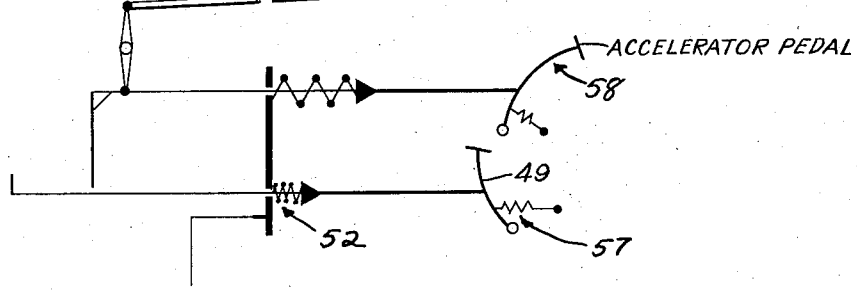
Figure 6 is an elevational view of an arrangement for injecting water at the supercharger inlet in a vehicle having a centrifugal supercharger.
Figure 6:
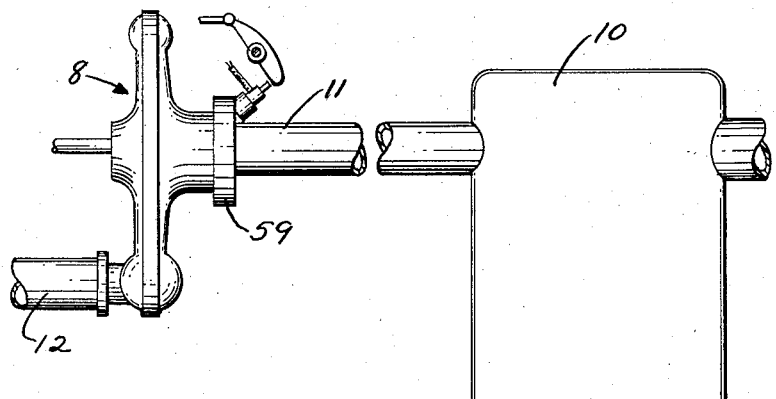
Figure 7:
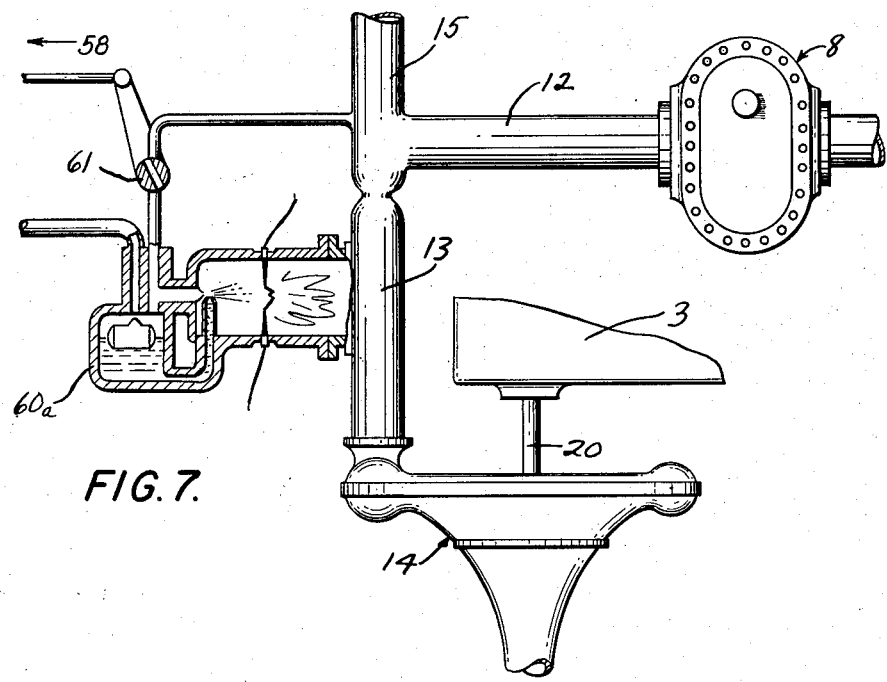
Figure 7 is an elevational view partly in section of an injection fuel combustion chamber which may be incorporated in the construction shown in Figure 1.

In the case where the fully-loaded vehicle is under adverse conditions, as when it is on very bad terrain or on sandy ground, the super-power pedal 58 is used (Figures 5, 6 and 7). Along part of its course, it brings about the injection of water into the chamber 54, situated behind the compressor, or into the chamber 59, situated in front of the compressor. This action decreases the air inlet temperature of the engine. In this manner the weight of the air increases and the power and the torque of the engine thereby increase, if the injection flow of fuel simultaneously increases with the injection flow of the water. During the last part of its course, the pedal 58 acts on the spark in the combustion chamber and on the valve 61, Figure 7. The air sent by the compressor to the turbine 14, by means of the pipe 13, is then heated. This increases the flow of gases sent to the turbine and consequently causes its driving torque to increase.

When the vehicle is started, one can move along slowly in spite of the fact that a direct connection exists between the engine and the rear axle 6. This slow pace is assured by the action of the flexible arrangements shown in Figures 10 and 11 which take up or absorb any irregularity in the running of the engine, in such manner so that neither the engine nor the vehicle will have any tendency to vibrate.

When the vehicle has reached a certain speed, the ratio of the turbine 14 automatically changes because of the gear movement centrifugally induced by the blocks 30 from one part of the free wheel 27 to the other. The turbine then drops to a more moderate speed and its torque is once again ready for another increase of the speed of the vehicle.

When the vehicle is allowed to roll freely, all of the pedals are in the rest position, and the shaft 34 rotates in a direction which is the reverse of its normal direction in view of the fact that it is then driven by the shaft 4. This does not adversely affect the overfeed compressor, which merely slows down, in view of the fact that it is at the same time attracted in its proper direction by a strong vacuum which is created at the inlet of the engine and which predominates and drives the shaft 34, and the shafts 7 and 45, as well as the annulus 32. However, this slowing down could have an adverse effect on other auxiliary apparatus units, for example, on the water pump and the oil pump of the engine, in the case in which they are driven by the shafts 45 and 40. The pinions 46 and 37 will then assure the normal engagement of these apparatus units, by the play of the free wheels 47 and 38, which become mobile when the speed of the shaft 34 drops below a certain relative value as compared to the speed of the shaft 2.

In order to obtain an economical operation of the vehicle, the driver rests on the pedal 50. The shaft 34 is then blocked. The speed of the vehicle during the blocked state of the shaft 34 increases in view of the fact that the power distributed ahead of this shaft, now returns to the shaft 4. The necessary and usual operation of certain auxiliary apparatus units, such as the fan, the water pump, and the oil pump, is once again assured by the pinions 46 and 37. The compressor itself, will be able to rotate freely, driven by the vacuum at the inlet of the engine while acting on the pedal 62 which activates the clutch 55.

During a change of speeds, all of the pedals are in the rest position. The change can therefore take place without difficulty in view of the fact that the shaft 34 is free and there is no torque inertia of the engine exerted at the inlet of the change-speed gear 5.

In order to obtain an uninterrupted operation or driving of the vehicle at high altitude, a torque converter is provided at 55. It changes the ratio of overmultiplication of the compressor in the necessary direction as the decrease of the atmospheric pressure affects it. By means of the action of the converter, the compressor supplies an increased compression ratio at high altitude. A very small variation in the ratio of the torque of the converter is sufficient to cause a considerable increase of the compression ratio of the compressor.

When it is desired to brake the vehicle, the pressure on the brake pedal 51 causes the shaft 34 to stop by the action of the clutch 42 against the fixed linings 49'. Upon the stopping of the shaft 34, the auxiliary devices, such as the compressors for the compressed air, the oil pump and the water pump of the engine, will be able to continue to operate regularly by the action of the pinions 46, 37 and of the free wheels 47, 38.

I claim:

1. A device for increasing the power of a vehicle having an internal combustion engine and a turbine having an inlet pipe and an output shaft, a mechanism for distributing the engine power to a main transmission shaft, at least one supercharging compressor supercharging the engine and a compressed air circuit including said compressor and communicating with said turbine inlet pipe, a first accelerator pedal and a brake pedal, and a step-up gear mechanism for driving auxiliary apparatus including said compressor, said device comprising clutch means interposed in said step-up gear mechanism and controlled by said accelerator pedal and said brake pedal, water injection means in the compressed-air circuit, and mechanical coupling elements between said turbine and the main transmission shaft connected to decrease automatically the transmission ratio from said turbine when said vehicle attains a predetermined minimum speed, whereby to prevent said turbine from racing.

2. A device as defined in claim 1, wherein said vehicle includes a second accelerator pedal and wherein said clutch means is actuated by said brake pedal and one of said two accelerator pedals, said first accelerator pedal being connected to control the engine speed and its maximum fuel consumption, and the actuation of the engine supercharging compressor, and the second accelerator pedal and the brake pedal being adapted to disconnect said compressor.

3. A device as defined in claim 1, wherein said mechanical coupling elements include a first gear pair and a second gear pair between the output shaft of said turbine and said main transmission shaft, the said first gear pair including a pinion mounted on said output shaft of said turbine for unidirectional rotation therewith, and said second gear pair including a toothed annulus rotating freely on said transmission shaft and a coupling device of the centrifugal clutch type to engage said second gear pair when said transmission shaft attains a predetermined minimum speed.

4. A device as defined in claim 3, wherein said compressor is driven by said power distributing mechanism and wherein a torque converter is interposed in the drive connection to said compressor.

5. A device as defined in claim 3, wherein a flexible coupling is disposed in said step-up gear mechanism controlling said auxiliary apparatus to compensate for irregular engine running at low speeds.

6. A device as defined in claim 5, wherein said step-up gear mechanism is contained in a case and said flexible coupling comprises elastic suspension means for said case.

References Cited in the file of this patent

UNITED STATES PATENTS

| 2,149,785 | Neugebauer | Mar. 7, 1939 |
| 2,467,077 | Brunken | Apr. 12, 1949 |
| 2,497,338 | Baron | Feb. 14, 1950 |
| 2,620,621 | Nettel | Dec. 9, 1952 |
| 2,621,472 | Udale | Dec. 16, 1952 |

FOREIGN PATENTS

| 929,461 | France | July 15, 1947 |